(12) United States Patent
Thakkar et al.

(10) Patent No.: US 12,254,780 B2
(45) Date of Patent: Mar. 18, 2025

(54) COMPUTING DEVICE AND METHOD FOR TRACKING MOVEMENT OF OBJECTS

(71) Applicant: THE BOEING COMPANY, Chicago, IL (US)

(72) Inventors: Rahul C. Thakkar, Arlington, VA (US); Michael J. Marich, Seal Beach, CA (US); Tad W. Kellogg, Bellevue, WA (US); Surya K. Pandrangi, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 412 days.

(21) Appl. No.: 17/540,092

(22) Filed: Dec. 1, 2021

(65) Prior Publication Data
US 2022/0171397 A1     Jun. 2, 2022

Related U.S. Application Data

(60) Provisional application No. 63/120,499, filed on Dec. 2, 2020.

(51) Int. Cl.
G08G 9/02     (2006.01)

(52) U.S. Cl.
CPC ..................... *G08G 9/02* (2013.01)

(58) Field of Classification Search
CPC ....................................... G08G 9/02
See application file for complete search history.

(56) References Cited

U.S. PATENT DOCUMENTS

| 9,761,142 B2* | 9/2017 | Pflug | B60T 7/22 |
| 11,488,393 B2* | 11/2022 | May | G06V 20/584 |
| 2019/0243371 A1* | 8/2019 | Nister | G05D 1/0223 |

(Continued)

OTHER PUBLICATIONS

Ruiz, Sergio et al. "A Medium Term Conflict Detection and Resolution system for Terminal Maneuvering Area based on Spatial Data Structures and 4D Trajectories", Jan. 2013, Elsevier, Transportation Research Part C: Emerging Technologies, vol. 26, pp. 396-417 (Year: 2013).*

(Continued)

*Primary Examiner* — Todd Melton
*Assistant Examiner* — Sarah A. Mueller
(74) *Attorney, Agent, or Firm* — Harrity & Harrity, LLP

(57) ABSTRACT

A computing device, method and computer program product track the movement of objects and identify potential collisions between object influence models of two or more objects. In a method, an object influence model is defined for a respective object with the object influence model having a shape and volume that encompasses the respective object. The object influence model extends beyond the respective object and varies in response to changes in one or more properties of the object. The method also includes receiving information from one or more sensors indicative of movement of the respective object and predicting its anticipated path of travel. The method further includes identifying a potential collision between the respective object and another object in an instance in which the object influence models of the respective object and another object intersect as the respective object is advanced along the anticipated path of travel.

20 Claims, 5 Drawing Sheets

(56) References Cited

U.S. PATENT DOCUMENTS

2020/0086855 A1* 3/2020 Packer .................. G08G 1/166
2021/0155257 A1* 5/2021 Alcazar Olan ....... B60W 30/09

OTHER PUBLICATIONS

Chun, Hsine-Chu et al., "Elastic Object Modeling in a VR-Based Telerobotic System", Jun. 19, 2004, Proceedings of the 5th World Congress on Intelligent Control and Automation, 4526-4529 (Year: 2004).*

* cited by examiner

COMPUTING DEVICE AND METHOD FOR TRACKING MOVEMENT OF OBJECTS

CROSS-REFERENCE TO RELATED APPLICATIONS

This application claims benefit of U.S. Provisional Application No. 63/120,499, filed Dec. 2, 2020, the entire contents of which are incorporated herein by reference.

TECHNOLOGICAL FIELD

An example embodiment relates generally to a computing device, method and computer program product for tracking the movement of objects and, more particularly, for identifying a potential collision between objects utilizing an object influence model having a shape and a volume that vary in response to changes in one or more properties of a respective object.

BACKGROUND

In a number of settings, one or more objects move about a platform. These objects may include people and/or mechanized objects, such as vehicles. In many circumstances, it is desired that the objects do not intersect or collide with one another since to do so may injure a person, damage a mechanized object or at least interrupt the movement of the various objects such that a task to be performed in conjunction with the movement of the objects is conducted in a less efficient manner.

While objects may move about various platforms, one example of a platform upon which a variety of different types of objects moves is the deck of a ship. In this setting, one or more people as well as one or more vehicles, such as forklifts, aircraft, carts and the like, move about the deck. In addition to the objects in motion, a plurality of stationary objects are also typically positioned about the deck including various railings, steps, storage facilities, armaments, equipment bays and the like. In order to avoid injury to a person or damage to other objects moving about the deck, not only must the objects in motion avoid collisions with one another, but the objects in motion must also avoid inadvertent collisions with the stationary objects. However, the avoidance of such collisions may be a challenge in some circumstances, particularly in instances in which a number of different objects are in motion at the same time and even more so in instances in which people who are moving about the deck are preoccupied with other matters and fail to notice the other objects in there vicinity.

In some instances, not only are physical collisions between objects to be avoided, but some objects influence the surrounding environment to such an extent that other objects should not even be near the object to be avoided. For example, some objects may generate a large amount of heat during operation and cause the temperature of the surrounding environment to be substantially elevated. In this example, other objects should not just avoid a physical collision with the object that generates heat, but the other objects should maintain at least a predefined distance from the object that generates heat so as not to be subjected to and adversely impacted by the heat that is generated. As with efforts to avoid collisions between objects, efforts to insure that ample space is maintained relative to an object that influences the surrounding environment in a manner that may create potential safety or operational issues for other objects may be challenging to provide in a consistent manner, particularly in instances in which people moving about the deck are preoccupied with other matters.

BRIEF SUMMARY

A computing device, a method and a computer program product are provided in accordance with an example embodiment in order to track the movement of objects. By tracking the movement of objects, potential collisions between objects may be identified and, some embodiments, alerts may be provided and/or actions may be taken to reduce the risk of a potential collision. As a result, the computing device, method and computer program product of an example embodiment increase the safety for the objects and decrease the risk of damage to the objects. The computing device, method and computing program product of an example embodiment also take into an account an object influence model having a shape and volume that encompasses a respective object, but that extends beyond the respective object in a manner that varies in response to changes in one or more properties of the object. By considering the object influence model of a respective object, the computing device, method and computer program product of an example embodiment may not only identify instances in which objects are anticipated to physically collide, but also instances in which the object influence models of two or more objects may intersect and a risk for discomfort, damage or injury may exist. Thus, the computing device, method and computer program product of an example embodiment can also reduce the risk of potential intersections between the object influenced models of two or more objects, such as by providing an alert or causing an action to be taken, thereby also reducing the risk of damage or injury in these circumstances.

In an example embodiment, a method is provided for tracking movement of an object. The method includes defining, for respective object, an object influence model having a shape and a volume that encompasses the respective object. The method defines the object influence model by causing the shape and the volume of the object influence model to extend beyond the respective object and to vary in response to the changes in one or more properties of the object. The method also includes receiving information from one or more sensors indicative of movement of the respective object. The method further includes predicting an anticipated path of travel of the respective object based upon the information from one or more sensors indicative of movement of the respective object. The method also includes identifying a potential collision between the respective object and another object in an instance in which the object influence model of the respective object intersects with an object influence model of another object as the respective object is advanced along the anticipated path of travel.

The method of an example embodiment causes the shape and the volume of the object influence model to extend beyond the respective object and to vary by causing spatiotemporal variations in the object influence model in response to changes in the one or more properties of the object. The method of an example embodiment causes the shape and the volume of the object influence model to extend beyond the respective object and to vary based upon an extent of influence caused by the respective object upon an environment surrounding the respective object. In this example embodiment, the method may define the object influence model by causing the shape and the volume of the object influence model to extend beyond the respective object and to vary in response to radiation generated by the object or air moved by the object.

The method of an example embodiment also includes defining the object influence model of another object to have a shape and volume that encompasses another object and varies in response to changes in one or more properties of another object. The method of an example embodiment receives information from one or more sensors by receiving information regarding one or more behavior properties of the respective object from the one or more sensors carried by the respective object. In an example embodiment, the method also includes causing an alert to be provided in an instance in which a potential collision is identified between the respective object and another object. Additionally or alternatively, the method of an example embodiment includes causing an action to be performed in an instance in which a potential collision is identified between the respective object and another object. By providing an alert or taking an action in response to the identification of a potential collision, the likelihood of damage or injury to one or more of the objects is reduced. In an example embodiment, the method identifies the potential collision between the respective object and another object by utilizing a machine learning algorithm and to identify a potential collision. In some embodiments, another object is an autonomous machine configured to operate in an autonomous manner.

In another example embodiment, a computing device is provided that is configured to track objects. The computing device includes a communication interface configured to receive information from one or more sensors indicative of movement of a respective object. The computing device also includes processing circuitry configured to define an object influence model having a shape and a volume that encompasses the respective object. The object influence model is defined by causing the shape and the volume of the object influence model to extend beyond the respective object and to vary in response to changes in one or more properties of the object. The processing circuitry is also configured to predict an anticipated path of travel of the respective object based upon the information from the one or more sensors indicative of movement of the respective object. The processing circuitry is further configured to identify a potential collision between the respective object and another object in an instance in which the object influence model of the respective object intersects with an object influence model of another object as the respective object is advanced along the anticipated path of travel.

The processing circuitry of an example embodiment is configured to cause the shape and the volume of the object influence model to extend beyond the respective object and to vary by causing spatio-temporal variations in the object influence model in response to the changes in the one or more properties of the object. In an example embodiment, the processing circuitry is configured to cause the shape and the volume of the object influence model to extend beyond the respective object and to vary based upon an extent of influence caused by the respective object upon an environment surrounding the respective object. In this example embodiment, the processing circuitry is configured to define the object influence model by causing the shape and the volume of the object influence model to extend beyond the respective object and to vary in response to radiation generated by the object or air moved by the object. The processing circuitry of an example embodiment is further configured to define the object influence model of another object having a shape and a volume that encompasses another object and that varies in response to changes in one or more properties of another object.

The communication interface of an example embodiment is configured to receive information from one or more sensors by receiving information regarding one or more behavioral properties of the respective object from one or more sensors carried by the respective object. In an example embodiment, the processing circuitry is further configured to cause an alert to be provided in an instance in which a potential collision is identified between the respective object and another object. Additionally or alternatively, the processing circuitry of an example embodiment is further configured to cause an action to be performed in an instance in which a potential collision is identified between the respective object and another object in order to reduce a likelihood of the potential collision. The processing circuitry of an example embodiment is configured to identify the potential collision between the respective object and another object by utilizing a machine learning algorithm to identify the potential collision.

In a further example embodiment, a computer program product is provided for tracking movement of objects. The computer program product includes a non-transitory computer readable medium having program code stored thereon with the program code including program code instructions configured, upon execution, to define, for a respective object, an object influence model having a shape and a volume that encompasses the respective object. The object influence model is defined by causing the shape and the volume of the object influence model to extend beyond the respective object and to vary in response to changes in one or more properties of the object. The program code also includes program code instructions configured to receive information from one or more sensors indicative of movement of the respective object and, in one embodiment, to receive information regarding one or more behavioral properties of the respective object from one or more sensors carried by the respective object. The program code further includes program code instructions configured to predict an anticipated path of travel of the respective object based upon the information from the one or more sensors indicative of movement of the respective object. The program code additionally includes program code instructions configured to identify a potential collision between the respective object and another object in an instance in which the object influence model of the respective object intersects with an object influence model of another object as the respective object is advanced along the anticipated path of travel.

The program code instructions configured to cause of the shape and the volume of the object influence model to extend beyond the respective object and to vary includes, in one example embodiment, program code instructions configured to cause spatio-temporal variations in the object influence model in response to changes in the one or more properties of the object. In an example embodiment, the program code instructions configured to cause the shape and the volume of the object influence model to extend beyond the respective object and to vary include program code instructions configured to cause the shape and the volume of the object influence model to extend beyond the respective object and to vary based upon the extent of influence caused by the respective object upon an environment surrounding the respective object. In this example embodiment, the program code instruction configured to define the object influence model may include program code instruction configured the cause the shape and the volume of the object influence model to extend beyond the respective object and to vary in response to radiation generated by the object or air moved by the object.

The program code of an example embodiment also includes program code instructions configured to define the object influence model of another object having a shape and a volume that encompasses another object and that varies in response to changes in one or more properties of another object. In an example embodiment, the program code also includes program code instructions configured to cause an alert to be provided in an instance in which a potential collision is identified between the respective object and another object. Additionally or alternatively, the program code of an example embodiment may include program code instructions configured to cause an action to be performed in an instance in which a potential collision is identified between the respective object and another object in order to reduce a likelihood of the potential collision. The program code instructions of an example embodiment are configured to identify the potential collision between the respective object and another object by utilizing a machine learning algorithm to identify the potential collision.

BRIEF DESCRIPTION OF THE FIGURES

Figure 1:
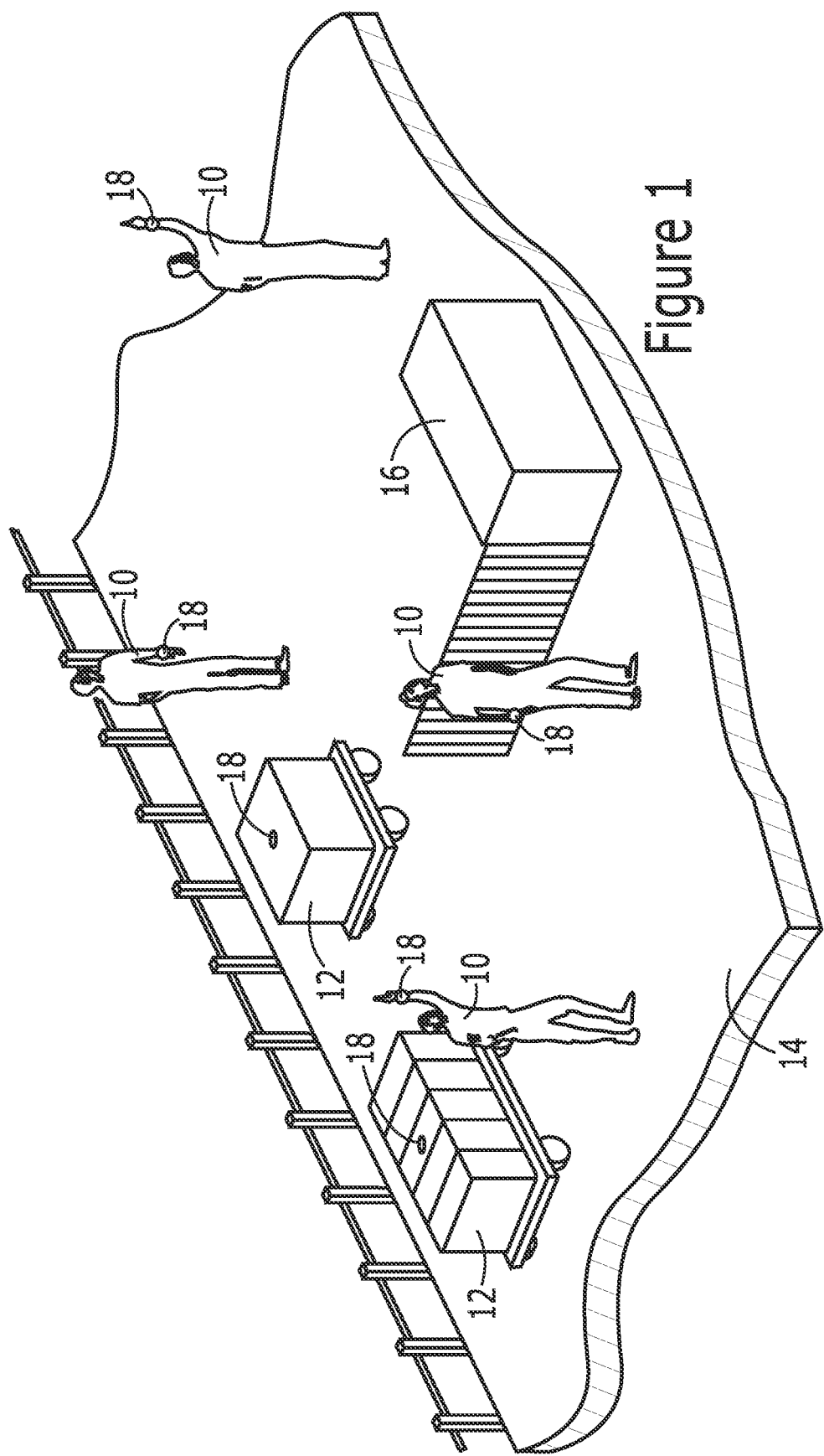
Figure 2:
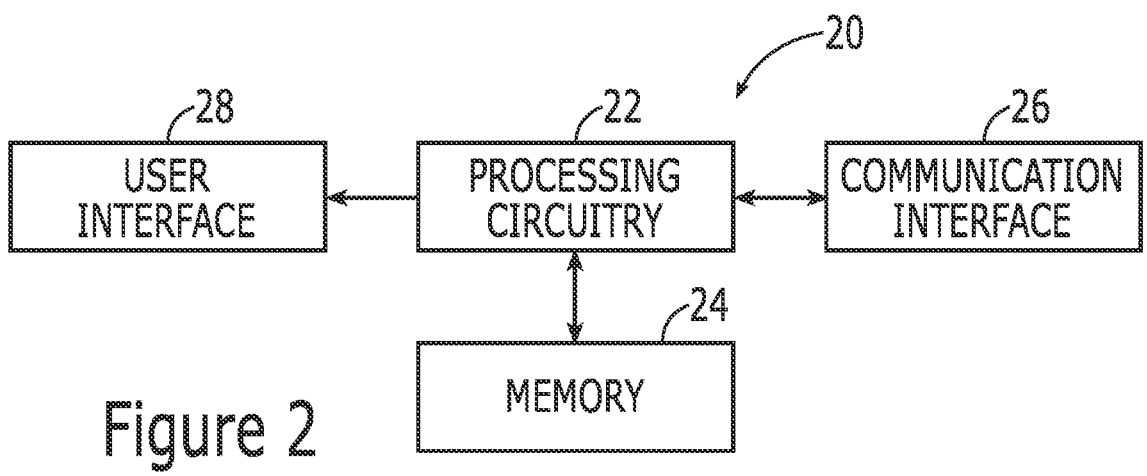
Figure 3:
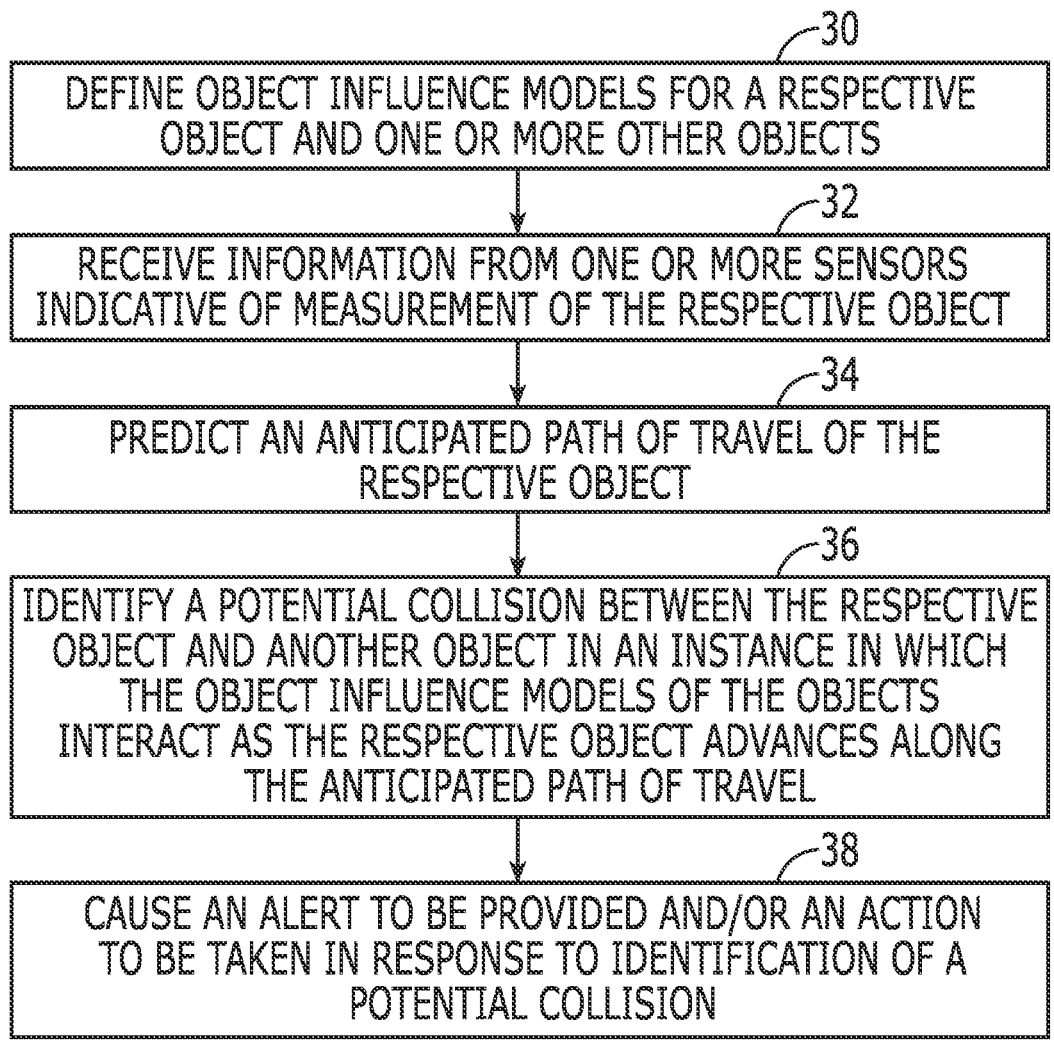
Figure 4:
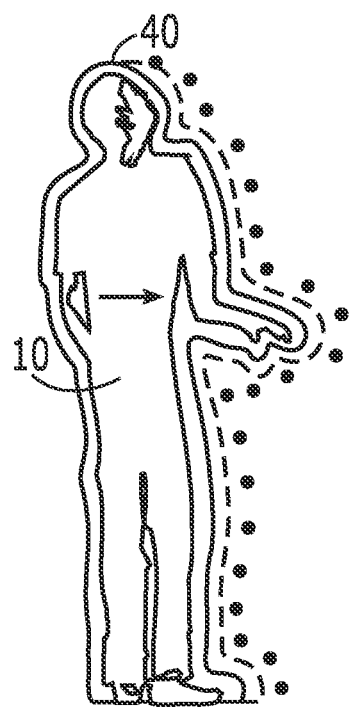
Figure 5:
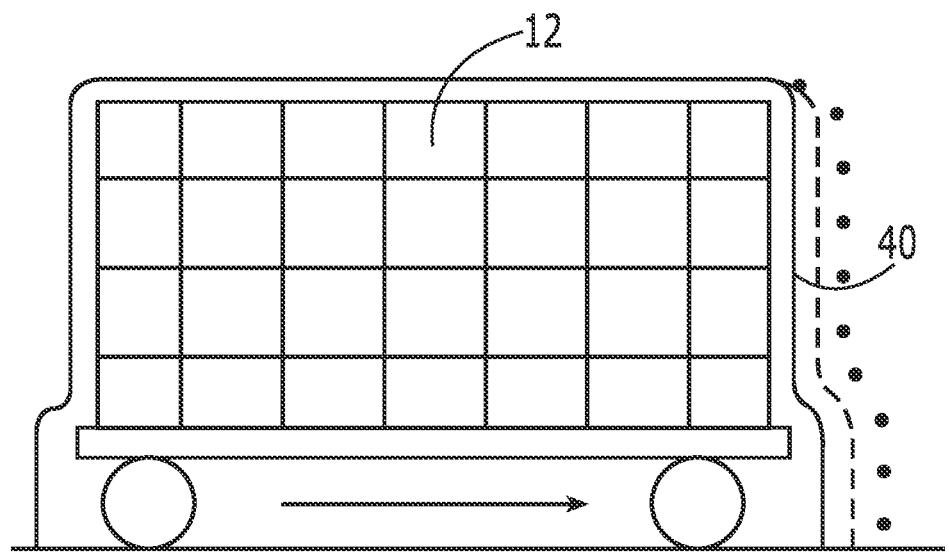
Figure 6:
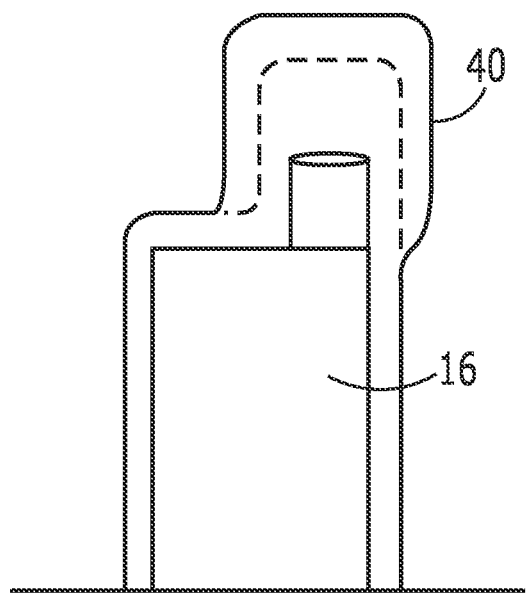
Figure 7:
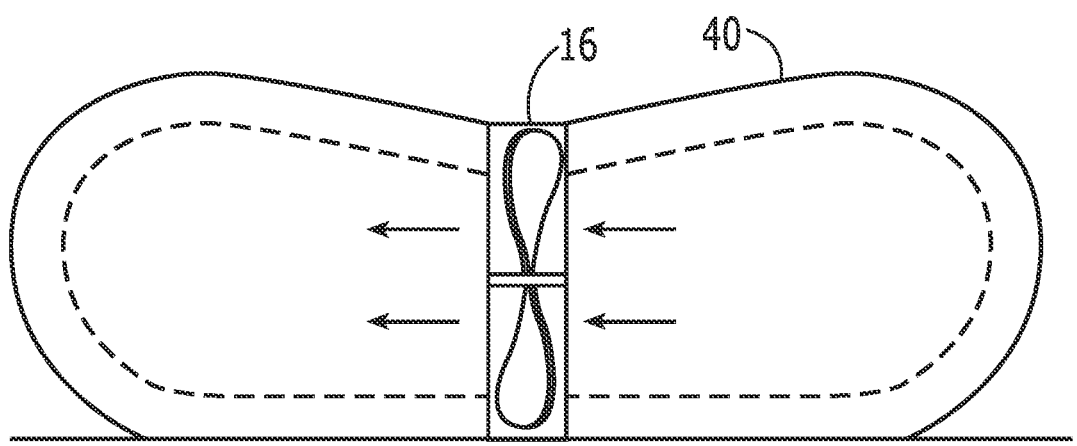
Figure 8:
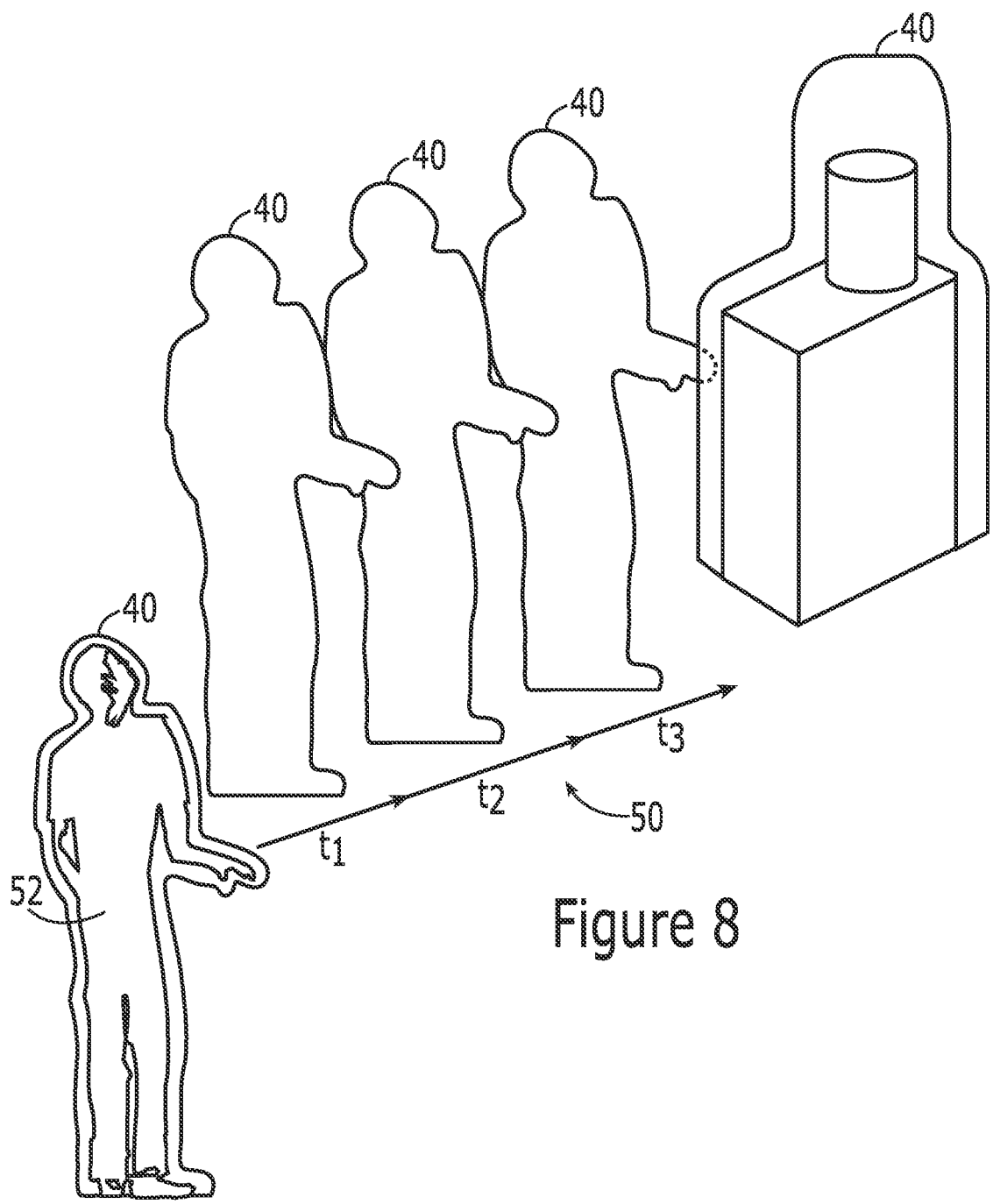

Having thus described certain example embodiments of the present disclosure in general terms, reference will hereinafter be made to the accompanying drawings, which are not necessarily drawn to scale, and wherein:

FIG. 1 is a schematic representation of the deck of a ship on which a plurality of people and a plurality of mechanized objects move relative to one another and relative to a plurality of static objects;

FIG. 2 is a block diagram of computing device that may be specifically configured in accordance with an example embodiment of the present disclosure;

FIG. 3 is a flowchart of the operations performed, such as by the computing device of FIG. 2, in accordance with an example embodiment of the present disclosure;

FIG. 4 illustrates an object influence model of a person that is defined in accordance with an example embodiment of the present disclosure;

FIG. 5 illustrates an object influence model of a vehicle that is defined in accordance with an example embodiment of the present disclosure;

FIG. 6 illustrates an object influence model of a boiler that is defined in accordance with an example embodiment of the present disclosure;

FIG. 7 illustrates an object influence model of a fan that is defined in accordance with an example embodiment of the present disclosure; and FIG. 8 illustrates the anticipated path of travel of a respective object and its potential collision with an object influence model of another object as identified in accordance with an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A computing device, method and computer program product are provided in accordance with an example embodiment in order to track the movement of an object. As illustrated by FIG. 1 as well as the examples provided below, the movement of a wide variety of different types of objects may be tracked. These objects include people 10 as well as mechanized objects 12, such as vehicles, carts, unmanned air vehicles, etc. In this regard, the mechanized objects that are tracked may include, but are not limited to, autonomous machines configured to operate in an autonomous manner, such as an autonomous launch mechanism onboard the deck of a ship to launch unmanned air vehicles. The movement of the objects may be tracked in a variety of different environments. In one example embodiment, however, the objects are configured to move upon a platform 14 which, in some embodiments, is also in motion, such as the deck of a ship. In addition to the objects in motion upon the platform, the platform may include one or more static objects 16, such as railings, stairs, walls, storage lockers, equipment bays or other fixed structures.

By tracking the movement of an object, a computing device, method and computer program product of an example embodiment may be configured to identify an instance in which the anticipated path of travel of an object will cause the object or, as described below, the object influence model of the object to potentially collide with another object or, more particularly, the object influence model of another object. By identifying the instances in which the object influence models of two or more objects will intersect along the anticipated path of travel of a respective object, the computing device, method and computer program product of an example embodiment may be configured to mitigate the resulting risk posed by the potential collision. In this regard, the computing device, method and computer program product of an example embodiment may cause an alert to be provided and/or an action to be taken such that one or more of the objects may be redirected or the movement of one or more of the objects may otherwise altered so as to reduce the risk of collision brought about by the anticipated path of travel of the objects. Thus, the computing device, method and computer program product of an example embodiment are configured to increase the safety with which objects move about a platform and correspondingly increase the efficiency with which the objects move about the platform and perform various tasks by avoiding the delays otherwise brought about by potential collisions between objects.

The computing device may be configured in various manners in order to track the movement of an object and to identify a potential collision between the object influence models of two or more objects in response to the anticipated path of movement of a respective object. For example, the computing device may be embodied in a server, a computer workstation, a personal computer, laptop computer, desktop computer, a cloud computing device, a virtual machine, a super computer, a high-performance computing (HPC) cluster, a graphics processing unit, a gaming engine, a backend mathematical platform, a massively multi-player game simulation system, such as the Unreal Engine developed by Epic Games, or the like.

Regardless of the manner in which the computing system 20 is embodied, the computing system of an example embodiment includes, is in communication with or is otherwise associated with a processing circuitry 22, memory 24, a communication interface 26 and an optional user interface 28. The processing circuitry may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry is configured to execute instructions stored in the memory or otherwise accessible to the processing circuitry. These instructions, when executed by the processing circuitry, may cause the computing system to perform one or more of the functionalities described herein. As such, the computing system may comprise an entity capable of performing operations according to embodiments of the present disclosure while configured accordingly. Thus, for example, when the processing circuitry is embodied as an ASIC, FPGA or the like, the processing circuitry and, correspondingly, the computing system may comprise specifically configured hardware for conducting one or more operations described herein. Alternatively, as another example, when the processing circuitry is embodied as an executor of instructions, such as may be stored in the memory, the instructions may specifically configure the processing circuitry and, in turn, the computing system to perform one or more algorithms and operations described herein.

The memory 24 may include, for example, non-volatile memory. The memory may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory may comprise any non-transitory computer readable storage medium. The memory may be configured to store information, data, applications, instructions, or the like for enabling the computing system 20, such as the processing circuitry 22, to carry out various functions in accordance with example embodiments of the present disclosure. For example, the memory may be configured to store program instructions for execution by the processing circuitry.

The communication interface 26 may be in communication with the processing circuitry 22 and the memory 24 and may be configured to receive and/or transmit data, such as described below. The communication interface may include, for example, one or more antennas and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

If the computing system 20 includes a user interface 28, the user interface may be in communication with the processing circuitry 22 and the memory 24 to receive an indication of a user input and/or to provide an audible, visual, mechanical, or other output to a user. As such, the user interface may include, for example, a display and one or more speakers for providing visual and audible output to a user. Other examples of the user interface include a keyboard, a mouse, a joystick, a microphone and/or other input/output mechanisms.

The operations performed, such as by the computing system 20, in accordance with an example embodiment are depicted in FIG. 3. As shown in block 30 of FIG. 3, the computing system, such as the processing circuitry 22, is configured to define an object influence model for a respective object and, in at least some embodiments, for each of a plurality of objects. The respective object for which an object influence model is defined may be an object that is capable of moving about the platform 14. However, object influence models may also be defined for other objects including objects 16 that are stationary upon the platform.

The object influence model of a respective object has a shape and a volume that encompasses the respective object. Thus, the entirety of the respective object lies within the object influence model. However, the object influence model is defined to have a shape and a volume that extends beyond the respective object and that varies in response to changes in one or more properties of the object. For example, the object influence model may be a virtual spline-based bubble that changes its shape and volume in response to changes in the properties of the object. The properties of the object that are taken into account in relation to the shape and size of the object influence model include those properties that influence the environment surrounding the respective object, such as the immediate environment. In this regard, the computing device 20, such as the processing circuitry 22, is configured to cause the shape and the volume of the object influence model to extend beyond the respective object and to vary in a manner that is based upon the extent of influence caused by the respective object upon the environment surrounding the respective object. Thus, in instances in which the influence caused by the respective object upon the surrounding environment is greater and extends further from the respective object, the shape and volume of the object influence model may be larger than in those instances in which the influence caused by the respective object upon the surrounding environment extends only a smaller distance from the respective object.

As described below in conjunction with an example of an object, the computing device 20, such as the processing circuitry 22, may be configured to cause the volume of the object influence model to increase or decrease by an equal amount from all sides or portions of the respective object in an instance in which the extent of the influence caused by the respective object upon the surrounding environment is equal on all sides, that is symmetric, relative to the respective object. In contrast, in instances in which the extent of the influence caused by the respective object upon the surrounding environment is different in different directions relative to the respective object, the computing device, such as the processing circuitry, may be configured to cause the volume of the object influence model to extend outward from different sides or portions of the respective object by different amounts based upon the extent of the influence caused by the respective object upon the surrounding environment in those different directions. For example, in an instance in which the influence caused by the respective object upon the surrounding environment is greater and extends further from the respective object in a first direction than in a second direction, the computing device, such as the processing circuitry, may be correspondingly configured to cause the volume of the object influence model to increase by a greater extent in the first direction than in the second direction. In this regard, the change in volume of the object influence model in a particular direction relative to the respective object may be dependent upon and, in some embodiments, may be proportional to the extent of the influence caused by the respective object upon the surrounding environment in the particular direction. By way of example, the computing device, such as the processing circuitry, may cause the volume to increase by more in a particular direction in an instance in which the respective object creates a greater influence upon the environment in that same direction than in an instance in which the respective object creates less of an influence upon the environment.

By way of example, FIG. 4 depicts an object in the form of a person 10. In accordance with an example embodiment, the computing device 20, such as the processing circuitry 22, is configured to define an object influence model 40 that encompasses the person. In an instance in which the person is stationery and not in motion, the computing device, such as the processing circuitry, may be configured to define the object influence model to have the same shape and size as the person. Or, as depicted in FIG. 4, the computing device, such as the processing circuitry, may be configured to define the object influence model to be larger than the person, thereby extending outward from the person, such as by a predefined amount.

The computing device 20, such as the processing circuitry 22, of an example embodiment may be configured to cause the shape and the volume of the object influence model 40 to extend beyond the respective object and to vary by causing a spatio-temporal variation in the object influence model in response to changes in one or more properties of the object, such as one or more properties that create an influence upon the surrounding environment. Thus, the object influence model need not be static in shape and volume, but may have a shape and volume that change as properties of the object correspondingly change. For example, an object in the form of a person 10 that is shown in FIG. 4 may have an object influence model as shown in solid lines that extends outwardly from all sides or portions of the person by the same predefined distance in an instance in which the person is stationery. However, in an instance in which the person begins to move, such as by walking or running, in a first direction, the computing device, such as the processing circuitry, may be configured to cause the size and the shape of the object influence model to change, thereby introducing a spatio-temporal variation to the object influence model. As an object in motion, such as a person walking or running, has inertia in the direction of motion, the computing device, such as the processing circuitry, may be configured to cause that portion of the object influence model that extends outwardly from the object in the same direction in which the object is moving, that is, the first direction, to extend further beyond the object than other portions of the object influence model including those portions that extend outwardly from the object in the opposite direction from the direction in which the object is moving. As shown in dashed lines in FIG. 4, the portion of the object influence model that extends in front of the person may extend further from the person than the portion of the object influence model that extends rearward of the person.

The extent to which the object influence model 40 extends outwardly relative to the object may be dependent upon various properties including the speed with which the object is moving, the weight of the object, etc. In one example embodiment, the distance by which the object influence model extends in advance of a person who is running or walking may be dependent on, such as proportional to, the speed at which the person is running or walking. Thus, a person moving faster is surrounded by an object influence model that extends further forward of the person as shown in a dotted line in FIG. 4 than a person walking or running at a slower speed as shown in the dashed line in FIG. 4.

Referring now to FIG. 5, another object, namely, a mechanized object 12, for which an object influence model 40 may be defined is depicted. In this example, the object is a vehicle that is configured to alternately be stationery or in motion. As with the example in which the object is a person 10, the computing device 20, such as the processing circuitry 22, is configured to define the object influence model to encompasses the vehicle. In an instance in which the vehicle is stationery and not in motion, the computing device, such as the processing circuitry, may be configured to define the object influence model to have the same shape and size as the vehicle. Or, as depicted in FIG. 5, the computing device, such as the processing circuitry, may be configured to define the object influence model to be larger than the vehicle, thereby extending outward from the vehicle, such as by a predefined amount.

As described in conjunction with FIG. 4, the object influence model 40 may have a shape and volume that change as properties of the object correspondingly change. For example, an object in the form of a vehicle 12 that is shown in FIG. 5 may have an object influence model as shown in solid lines that extends outwardly from all sides or portions of the person by the same predefined distance in an instance in which the vehicle is stationery. However, in an instance in which the vehicle begins to move in a first direction, the computing device 20, such as the processing circuitry 22, may be configured to cause the size and the shape of the object influence model to change, thereby introducing a spatio-temporal variation to the object influence model. The computing device, such as the processing circuitry, may be configured to cause that portion of the object influence model that extends forwardly from the vehicle in the same direction in which the vehicle is moving, that is, the first direction, to extend further beyond the vehicle than other portions of the object influence model including those portions that extend rearwardly from the vehicle. As shown in dashed lines in FIG. 5, the portion of the object influence model that extends in front of the vehicle may extend further from the vehicle than the portion of the object influence model that extends rearward of the vehicle.

As also described above in relation to FIG. 4, the distance by which the object influence model 40 extends in advance of a vehicle 12 that is being driven may be dependent on, such as proportional to, the speed of the vehicle. Thus, a vehicle being driven at a greater speed is surrounded by an object influence model that extends further forward of the vehicle as shown in a dotted line in FIG. 5 than a vehicle that is being driven at a slower speed as shown in the dashed line in FIG. 5.

As noted above, the computing device 20, such as the processing circuitry 22, is configured to cause the shape and the volume of the object influence model 40 to vary in response to changes in one or more properties of the object. Various properties of the object may be utilized in relation to defining the object influence model and the extent to which the volume of the object influence model varies. In this regard, the speed with which an object moves may be a property that is considered in relation to the manner in which the shape and the volume of an object influence model is varied as described above in conjunction with a person 10 and a vehicle 12 as shown in FIGS. 4 and 5, respectively. Other properties of the object that may be considered include, for example, radiation emitted by the object, such as in terms of heat or other forms of radiation. In this regard, increases in the heat or other forms of radiation emitted by the object may cause the object influence model to expand so as to extend further from the object and to encompass that portion of the surrounding environment that is affected by the radiation.

By way of example, FIG. 6 depicts an object in the form of a boiler 42 that, during operation, generates heat. In an instance in which the boiler is not in operation, the computing device 20, such as the processing circuitry 22, may define the object influence model to be the same shape and volume as the boiler itself. However, in an instance in which the boiler is operational and is generating heat, the computing device, such as the processing circuitry, may be configured to cause the shape and the volume of the object influence model 40 to expand, such as in a manner that is depended upon the radiation, e.g., the heat, produced by the boiler. For example, the distance by which the object influence model extends beyond the boiler may be proportional to the amount of heat generated by the boiler such that a boiler that generates more heat has a larger object influence model as shown in solid lines in FIG. 6 than a boiler that generates a smaller amount of heat for which the object influence model is shown in dashed lines.

The computing device 20, such as the processing circuitry 22, may be configured to generate the object influence model 40 in a manner that extends outwardly from the object by an equal amount in all directions. However, in some embodiments including the boiler 42 of FIG. 6, the computing device, such as the processing circuitry, is configured to define the object influence model in a manner that extends further from some portions of the object than from other portions based upon the influence of different portions of the object upon the surrounding environment. As shown in FIG. 6, for example, the boiler may be configured to generate heat from one portion thereof, but not from other portions which may, for example, be insulated or may otherwise remain cool. In this example embodiment depicted in FIG. 6, the computing device, such as the processing circuitry, may be configured to define the object influence model so as to extend further from that portion of the object influence model that generates the most heat and to not extend as far from those portions of the object that remains cool.

As exemplified by the boiler of FIG. 6, the object influence model may be defined not only for objects that may move, but also objects that remain stationery upon the platform. Another example of a stationary object 16 having an object influence model with a shape and a volume that varies is the fan of FIG. 7. In this example, the fan draws air from an upstream side of the fan and forces the air outward from the downstream side of the fan, thereby moving air across the platform 14. In an instance in which the fan is not operational, the computing device 20, such as the processing circuitry 22, may define the object influence model to be the same shape and volume as the fan itself. However, in an instance in which the fan is operational and is moving air across the platform, the computing device, such as the processing circuitry, may be configured to cause the shape and the volume of the object influence model 40 to expand, such as in a manner that is depended upon the quantity or speed of the air moved by the fan. For example, the distance by which the object influence model extends beyond the fan may be proportional to the speed of the air moved by the fan such that a fan that causes air to be moved with a greater speed has a larger object influence model as shown in solid lines in FIG. 7 than a fan that causes air to be moved at a slower speed for which the object influence model is shown in dashed lines.

As described in relation to the boiler 42 of FIG. 6, the computing device 20, such as the processing circuitry 22, is configured to define the object influence model 40 in a manner that extends further from some portions of the object than from other portions based upon the influence of different portions of the object upon the surrounding environment. As shown in FIG. 7, for example, the fan may be configured to move air along a centerline about which the blades of the fan rotate. In this example embodiment depicted in FIG. 7, the computing device, such as the processing circuity, may be configured to define the object influence model so as to extend further from that the fan along the centerline about which the blades rotate portion of the object influence model that generates the most heat and to not extend as far from other portions of the fan.

The objects for which object influence models 40 are defined may be associated with one or more sensors 18 for providing information regarding movement of the respective object and, in some embodiments, information regarding the one or more other properties of the object that are utilized in relation to defining the shape and volume of the object influence model. For example, the objects may carry or include the sensors or the sensors may be separate from the object but configured to provide information regarding movement or other properties of the object. In an example embodiment, the sensors include position sensors configured to determine the position of the object of different points in time. While any of a variety of position sensors may be employed, a global positioning system (GPS) sensor in combination with an inertial measurement unit (IMU) and optionally an accelerometer may be deployed in order to define the position of an object with a relatively high degree of resolution, such as on the order of centimeters or millimeters. With respect to sensors for measuring changes in one or more other properties of the object that are utilized in conjunction with variations in the shape and volume of the object influence model, examples of sensors include, but are not limited to, temperature sensors, wind speed sensors, radiation sensors, humidity sensors, pressure sensors, velocity sensors, weight sensors, direction sensors, spin sensors, rotation sensors or the like.

As shown, in block 32 of FIG. 3, the computing device 20, such as the communication interface 26, the processing circuitry 22 or the like, is therefore also configured to receive information, such as via a wireless network, from the one or more sensors 18 indicative of movement of the respective object and/or of one or more other properties of the respective object, such as the heat generated by the object, the wind speed generated by the object, etc. For example, the computing device may be configured to receive information from the sensors from which the location of the respective object in at least two and, in some embodiments three coordinate axes and orientation of the respective object, such as represented by an angle relative to a reference plane and an angle to a reference heading, may be determined at each of a plurality instances in time to thereby permit the movement of the respective object to be determined. Information may be received from the sensors, which has been captured at each of a plurality of instances in time with the information captured at a respective point in time being associated with an indication of the time of capture.

As shown in block 34 of FIG. 3, the computing device 20, such as the processing circuitry 22, is also configured to predict an anticipated path of travel of the respective object based upon the information from the one or more sensors 18 indicative of movement of the respective object. In this regard, the computing device, such as the processing circuitry, may be configured to predict the anticipated path of travel based upon a prior path of travel as defined by the location of the object at a plurality of points in time, such as a plurality of immediately preceding points in time. Based upon this prior path of travel of the object, the computing device, such as the processing circuitry, may be configured to predict the anticipated path of travel in the future by extrapolating from the prior path of travel.

The computing device 20, such as the processing circuitry 22, may be configured to predict the anticipated path of travel of the respective object based upon additional information along with the information from the one or more sensors 18 regarding movement of the respective object. For example, the computing device, such as the processing circuitry, may be configured to evaluate historical information regarding the path of travel of the same object or other objects of a similar type and may utilize the historical information to define the anticipated path of travel. For example, in an instance in which the historical information indicates that the same object travels along the same path at approximately the same time every day, the computing device, such as a processing circuitry, may be configured to define the anticipated path of travel to be the same path of travel as previously traveled in an instance in which the information from the one or more sensors is indicative of movement of the respective object in a manner consistent with that historical information. As another example, the computing device, such as the processing circuitry, may be configured to access information that defines the schedule of a person and may predict the anticipated path of travel based at least in part upon the schedule of the person. For example, in an instance in which the schedule information indicates that the person has a meeting at a particular location at a particular time, the computing device, such as a processing circuitry, may be configured to predict the anticipated path of travel of the person to be the most direct route to the particular location so long as the information received from the one or more sensors is consistent with the movement of the person toward the particular location.

As shown in block 36 of FIG. 3, the computing device 20, such as the processing circuitry 22, is also configured to identify a potential collision between the respective object and another object in an instance in which the object influence model of the respective object intercepts with, that is, comes in contact with the object influence model of another object as the respective object is advanced along the anticipated path of travel. The computing device, such as the processing circuitry, may be configured to identify the potential collision in various manners, but, in one embodiment, is configured to utilize a machine learning algorithm to identify the potential collision. In one embodiment, the machine learning algorithm identifies the potential collision based on crowd-sourced information provided by the sensor(s) associated with a plurality of objects, such as in real time, utilizing, for example, recursive knowledge-based scenario analysis.

By way of example of a potential collision, FIG. 8 depicts the anticipated path of travel 50 of a first object 52 relative to a second object 54. The locations of the first object and the object influence model 40 of the first object at each of a plurality of points in time designated t1, t2, t3, etc. are shown in FIG. 8. Although the object influence model is shown to have the same shape and volume at each point in time, the shape and volume of the object influence model may change over the course of time as described above in response to changes in the properties of the first object. At time t3, the object influence models of the first and second objects are shown to intersect, thereby indicating that the first and second objects potentially collide at time t3 if the first object continues along its respective path of travel.

It is noted that the reliance upon the object influence models 40 in relation to the identification of a potential collision is not necessarily predicated upon a potential collision between the objects themselves in an instance in which the object influence model of at least one of the objects extends outwardly beyond the respective object. Instead, the reliance upon the object influence models to identify a potential collision identifies those instances in which an object, if the objects were to continue to proceed along their respective anticipated paths of travel, would enter that portion of the environment surrounding the other object that is influenced by the respective object, such as a region that is heated by the other object, a region through which air is moved by the object, etc. As a result, the risk of potential collisions between the object influence models of two or more objects may be reduced as described below in order to reduce the risk that one of the objects may be subject to discomfort, injury or damage by being exposed to that portion of the environment that is influenced by the other object.

A potential collision may be identified between a respective object and another object that is stationary, such as a set of steps, a trip hazard, a railing, an edge of the platform or the like. Alternatively, the potential collision may be between a respective object and another object that is also in motion. In this instance, the computing device 20, such as the processing circuitry 22, is configured to determine whether the paths of travel of the respective objects cause the object influence models of the respective objects to collide or if the paths of travel of the objects will allow the objects to pass one another without the object influence models of the respective objects intersecting one another. Thus, the computing device, such as the processing circuitry, of an example embodiment not only defines an object influence model and predicts the anticipated path of travel of a respective object, but also defines the object influence model and predicts an anticipated path of travel of one or more other objects that are also moving about the platform 14.

In response to identifying a potential collision, the computing device 20, such as the processing circuitry 22, the communication interface 26, the user interface 28 or the like, may be configured to cause an alert to be provided, such as via a display presented by the user interface. See block 38 of FIG. 3. In this regard, the alert may be provided to one or both of the objects that have been determined to potentially collide such that one or both of the objects may change its behavior, such as by changing its path of travel, coming to a halt, changing its rate of travel or the like so as to avoid the potential collision. Additionally or alternatively, the computing device, such as the processing circuitry, the communication interface or the like may be configured to cause an alert to be provided to other objects, such as on a publish-subscribe basis to other people in the vicinity of the objects that have been determined to potentially collide such that these other people may warn the objects so as to avoid the potential collision. Still further, the computing device, such as the processing circuitry, the communication interface or the like, may be configured to cause a more general alert to be provided, such as an alert that is broadcast or multitask to a plurality of recipients, to provide a warning of the potential collision and to allow for one or both of the objects that have been identified to potentially collide to alter their anticipated paths of travel.

In addition to or instead of causing an alert to be provided, the computing device 20 of an example embodiment, such as the processing circuitry 22, the communication interface 26 or the like, may be configured to cause an action to be performed in an instance in which a potential collision has been identified. See block 38 of FIG. 3. The computing device, such as the processing circuitry, the communication interface or the like, may be configured to cause a variety of different actions to be performed so as to reduce the risk of the potential collision. For example, some objects may operate in an autonomous or semi-autonomous manner with their movement being predefined. In this instance, the computing device, such as the processing circuitry, the communication interface or the like, may be configured to cause instructions to be provided to the object to cause the path of travel of the object altered so as to reduce the risk of the potential collision.

A computing device 20, a method and a computer program product are therefore provided in accordance with an example embodiment in order to track the movement of objects and to identify potential collisions between the objects such that alerts may be provided and/or actions may be taken to reduce the risk of a potential collision. As a result, the computing device, method and computer program product of an example embodiment increase the safety for the objects and decrease the risk of damage to the objects. As described, the computing device, method and computing program product of an example embodiment also take into an account an object influence model having a shape and volume that encompasses a respective object, but that extends beyond the respective object in a manner that varies in response to changes in one or more properties of the object. By considering the object influence model of a respective object, the computing device, method and computer program product of an example embodiment may not only identify instances in which objects are anticipated to physically collide, but also instances in which the object influence models of two or more objects may intersect and a risk for discomfort, damage or injury may exist. Thus, the computing device, method and computer program product of an example embodiment can also reduce the risk of potential intersections between the object influenced models of two or more objects, such as by providing an alert or causing an action to be taken, thereby also reducing the risk of damage or injury in these circumstances.

As described above, FIG. 3 illustrates a flowchart of a computing system 20, method, and computer program product according to example embodiments of the present disclosure. It will be understood that each block of the flowchart, and combinations of blocks in the flowchart, may be implemented by various means, such as hardware and/or a computer program product comprising one or more computer-readable storage mediums having computer readable program instructions stored thereon. For example, one or more of the procedures described herein may be embodied by computer program instructions of a computer program product. In this regard, the computer program product(s) which embody the procedures described herein may be stored by one or more memory devices 24 of a computing system 20 and executed by a processing circuitry 22 of the computing system. In some embodiments, the computer program instructions comprising the computer program product(s) which embody the procedures described above may be stored by a plurality of memory devices 24. As will be appreciated, any such computer program product may be loaded onto a computer or other programmable apparatus to produce a machine, such that the computer program product including the instructions which execute on the computer or other programmable apparatus creates means for implementing the functions specified in the flowchart blocks. Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart blocks. The computer program instructions of one or more computer program products may also be loaded onto the computing system or other programmable apparatus to cause a series of operations to be performed on the computing system or other programmable apparatus to produce a computer-implemented process such that the instructions which execute on the computing system or other programmable apparatus implement the functions specified in the flowchart blocks.

Accordingly, blocks or steps of the flowchart support combinations of means for performing the specified functions and combinations of steps for performing the specified functions. It will also be understood that one or more blocks of the flowchart, and combinations of blocks in the flowchart, may be implemented by special purpose hardware-based computer systems which perform the specified functions or steps, or combinations of special purpose hardware and computer program products.

The above described functions may be carried out in many ways. For example, any suitable means for carrying out each of the functions described above may be employed to carry out embodiments of the present disclosure. In one embodiment, a suitably configured computing system 20 may provide all or a portion of the elements of the present disclosure. In another embodiment, all or a portion of the elements may be configured by and operate under control of a computer program product. The computer program product for performing the methods of embodiments of the present disclosure includes a computer-readable storage medium, such as the non-volatile storage medium, and computer-readable program code portions, such as a series of computer instructions, embodied in the computer-readable storage medium.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method of tracking movement of objects, the method comprising:
    for a respective object, defining an object influence model having a shape and a volume that encompasses the respective object, wherein defining the object influence model comprises causing the shape and the volume of the object influence model to extend beyond the respective object and to vary in response to changes in one or more physical properties unrelated to movement of the object and in response to movement of the object;
    receiving information from one or more sensors indicative of movement of the respective object;
    predicting an anticipated path of travel of the respective object based upon the information from the one or more sensors indicative of movement of the respective object, wherein predicting the anticipated path of travel of the respective object comprises predicting the anticipated path of travel of the respective object based on historical information regarding a path of travel that was previously traveled by the respective object; and identifying a potential collision between the respective object and another object in an instance in which the object influence model of the respective object intersects with an object influence model of the another object as the respective object is advanced along the anticipated path of travel.

2. A method according to claim 1 wherein causing the shape and the volume of the object influence model to extend beyond the respective object and to vary comprises causing spatio-temporal variations in the object influence model in response to the changes in the one or more physical properties of the object.

3. A method according to claim 1 wherein causing the shape and the volume of the object influence model to extend beyond the respective object and to vary comprises causing the shape and the volume of the object influence model to extend beyond the respective object and to vary based upon an extent of influence caused by the respective object upon an environment surrounding the respective object.

4. A method according to claim 3 wherein defining the object influence model comprises causing the shape and the volume of the object influence model to extend beyond the respective object and to vary in response to radiation generated by the object or air moved by the object.

5. A method according to claim 1 further comprising defining the object influence model of the another object having a shape and a volume that encompasses the another object and that varies in response to changes in one or more properties of the another object.

6. A method according to claim 1 wherein receiving information from one or more sensors comprises receiving information regarding one or more behavioral properties of the respective object from one or more sensors carried by the respective object.

7. A method according to claim 1 further comprising causing an alert to be provided in an instance in which a potential collision is identified between the respective object and the another object.

8. A method according to claim 1 further comprising causing an action to be performed in an instance in which a potential collision is identified between the respective object and the another object in order to reduce a likelihood of the potential collision.

9. A method according to claim 1 wherein identifying the potential collision between the respective object and the another object comprises utilizing a machine learning algorithm to identify the potential collision.

10. A method according to claim 1 wherein the another object comprises an autonomous machine configured to operate in an autonomous manner.

11. A method according to claim 1 wherein predicting the anticipated path of travel of the respective object further comprises determining whether the information received from the one or more sensors is consistent with the historical information regarding the path of travel that was previously traveled by the respective object and wherein predicting the anticipated path of travel of the respective object based on the historical information regarding the path of travel that was previously traveled by the respective object is dependent upon the information received from the one or more sensors being consistent with the historical information.

12. The method of claim 1, wherein the object influence model is a virtual spline-based bubble that changes its shape and volume in response to changes in the physical properties of the object.

13. The method of claim 1, wherein the object of influence model extends outwardly from all portions of the object by the same predefined distance in an instance in which the object is stationary.

14. The method of claim 1, wherein the one or more properties unrelated to movement of the object comprise at least one of radiation emitted by the object or a temperature of the object.

15. A computing device configured to track movement of objects, the computing device comprising:

a communication interface configured to receive information from one or more sensors indicative of movement of a respective object; and processing circuitry configured to:

define an object influence model having a shape and a volume that encompasses the respective object, wherein the object influence model is defined by causing the shape and the volume of the object influence model to extend beyond the respective object and to vary in response to changes in one or more physical properties unrelated to movement of the object and in response to movement of the object;

predict an anticipated path of travel of the respective object based upon the information from the one or more sensors indicative of movement of the respective object, wherein the anticipated path of travel of the respective object is predicted by predicting the anticipated path of travel of the respective object based on historical information regarding a path of travel that was previously traveled by the respective object; and identify a potential collision between the respective object and another object in an instance in which the object influence model of the respective object intersects with an object influence model of the another object as the respective object is advanced along the anticipated path of travel.

16. A computing device according to claim 15 wherein the processing circuitry is configured to cause the shape and the volume of the object influence model to extend beyond the respective object and to vary by causing spatio-temporal variations in the object influence model in response to the changes in the one or more physical properties unrelated to movement of the object.

17. A computing device according to claim 15 wherein the processing circuitry is configured to cause the shape and the volume of the object influence model to extend beyond the respective object and to vary by causing the shape and the volume of the object influence model to extend beyond the respective object and to vary based upon an extent of influence caused by the respective object upon an environment surrounding the respective object.

18. A computing device according to claim 15 wherein the processing circuitry is configured to identify the potential collision between the respective object and the another object by utilizing a machine learning algorithm to identify the potential collision.

19. A computer program product for tracking movement of objects, the computer program product comprising a non-transitory computer readable medium having program code stored thereon, the program code comprising program code instructions configured, upon execution, to:

for a respective object, define an object influence model having a shape and a volume that encompasses the respective object, wherein the object influence model is defined by causing the shape and the volume of the object influence model to extend beyond the respective object and to vary in response to changes in one or more physical properties unrelated to movement of the object and in response to movement of the object;

receive information from one or more sensors indicative of movement of the respective object;

predict an anticipated path of travel of the respective object based upon the information from the one or more sensors indicative of movement of the respective object, wherein the anticipated path of travel of the respective object is predicted by predicting the anticipated path of travel of the respective object based on historical information regarding a path of travel that was previously traveled by the respective object; and identify a potential collision between the respective object and another object in an instance in which the object influence model of the respective object intersects with an object influence model of the another object as the respective object is advanced along the anticipated path of travel.

20. A computer program product according to claim 19 wherein the program code instructions configured to cause the shape and the volume of the object influence model to extend beyond the respective object and to vary comprise program code instructions configured to cause spatio-temporal variations in the object influence model in response to the changes in the one or more physical properties unrelated to movement of the object.

* * * * *